United States Patent
Moyer et al.

(10) Patent No.: US 7,248,069 B2
(45) Date of Patent: Jul. 24, 2007

(54) METHOD AND APPARATUS FOR PROVIDING SECURITY FOR DEBUG CIRCUITRY

(75) Inventors: William C. Moyer, Dripping Springs, TX (US); Thomas E. Tkacik, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 781 days.

(21) Appl. No.: 10/638,795

(22) Filed: Aug. 11, 2003

(65) Prior Publication Data

US 2005/0039039 A1   Feb. 17, 2005

(51) Int. Cl.
*H03K 19/00* (2006.01)
*H04L 9/00* (2006.01)

(52) U.S. Cl. ............... 326/16; 714/724; 713/168

(58) Field of Classification Search ............ 326/8, 326/16, 37; 713/168; 714/724
See application file for complete search history.

(56) References Cited

U.S. PATENT DOCUMENTS

| 5,704,039 A | 12/1997 | Yhishay |
| 7,103,782 B1* | 9/2006 | Tugenberg et al. ......... 713/194 |
| 2001/0015654 A1 | 8/2001 | Habersetzer |
| 2002/0018380 A1 | 2/2002 | Shinmori |
| 2002/0166061 A1 | 11/2002 | Falik et al. |
| 2002/0174342 A1 | 11/2002 | Freeman et al. |
| 2003/0005335 A1* | 1/2003 | Watanabe .................. 713/202 |
| 2003/0014653 A1 | 1/2003 | Moller et al. |
| 2003/0140205 A1 | 7/2003 | Dahan et al. |
| 2003/0140245 A1* | 7/2003 | Dahan et al. ............... 713/200 |
| 2004/0123118 A1* | 6/2004 | Dahan et al. ............... 713/189 |

\* cited by examiner

*Primary Examiner*—Daniel Chang
(74) *Attorney, Agent, or Firm*—Susan C. Hill; Joanna G. Chiu

(57) ABSTRACT

The invention relates to debug circuitry (20) and more particularly to a method and apparatus for providing security for debug circuitry (20). In one embodiment, a plurality of non-volatile elements (38) are used in providing selective disabling and re-enabling of at least a portion of the debug circuitry (20). Authentication may also be used. The present invention may use any debug interface, including standard debug interfaces such as the JTAG debug interface defined by the IEEE.

20 Claims, 3 Drawing Sheets

METHOD AND APPARATUS FOR PROVIDING SECURITY FOR DEBUG CIRCUITRY

FIELD OF THE INVENTION

The present invention relates to debug circuitry, and more particularly to a method and apparatus for providing security for debug circuitry.

RELATED ART

Security for integrated circuits is becoming increasingly important as integrated circuits are being used in more and more security conscious applications. Some examples of such applications are smart cards, cellular telephones, internet communication devices, etc. In particular, it is often desirable to provide security against fraudulent or unauthorized access to one or more portions of the integrated circuit. Many integrated circuits include terminals that may be used to input and/or output information to/from the integrated circuit. Such input/output terminals may provide a path for unauthorized access to one or more portions of the integrated circuit. In addition, some input/output terminals to an integrated circuit may be used for debug, emulation, and/or testing purposes and may also provide a path for unauthorized access to one or more portions of the integrated circuit.

One common standard used for integrated circuit debug, emulation, and/or testing purposes is the well known JTAG (Joint Test Action Group) IEEE (Institute of Electrical and Electronic Engineers) 1194.1 test access port and boundary scan architecture. In addition to the standard JTAG interface, there are a wide variety of other debug, emulation, and/or test interfaces used for integrated circuits.

BRIEF DESCRIPTION OF THE DRAWINGS

The present invention is illustrated by way of example and not limited by the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

The terms "assert" and "negate" are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one. Also, the terms "logic level" and "logic state" are used interchangeably herein. The term "debug" as used herein is meant in a very encompassing sense and will include emulation and test functions as well.

Figure 1:
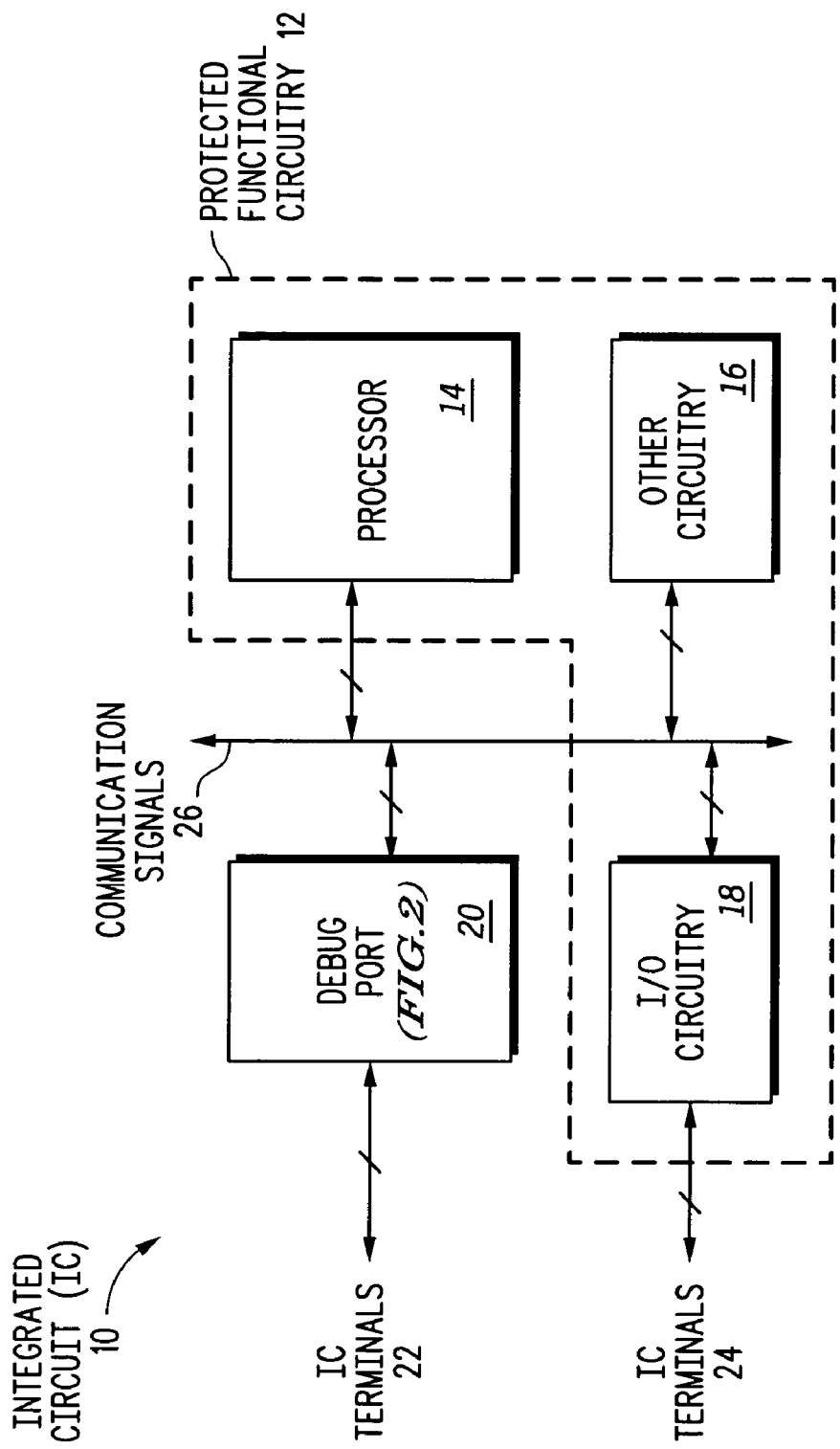
FIG. 1 illustrates, in block diagram form, an integrated circuit 10 in accordance with one embodiment of the present invention.

FIG. 1 illustrates, in block diagram form, an integrated circuit (IC) 10 in accordance with one embodiment of the present invention. In one embodiment, IC 10 includes a debug port 20 and protected functional circuitry 12. In one embodiment, protected functional circuitry 12 includes a processor 14, other circuitry 16, and input/output (I/O) circuitry 18 which are bi-directionally coupled to each other and to debug port 20 by way of communication signals 26. In one embodiment, processor 14 may be a processor which executes instructions of any type, for example, a central processing unit, a digital signal processor, a timer processing unit, etc. In one embodiment, other circuitry 16 may be circuitry that performs one or more of the intended functions of IC 10, but which does not necessarily require the execution of instructions to perform the intended function. Alternate embodiments of protected functional circuitry 12 may include only processor 14, only other circuitry 16, or both processor 14 and other circuitry 16. In one embodiment, I/O circuitry 18 is coupled to one or more IC terminals 24 in order to communicate to circuitry (not shown) external to IC 10. In alternate embodiments of the present invention, I/O circuitry 18 may include any type of external bus structure, including a data/address/control bus structure. Yet other embodiments of IC 10 may not even have I/O circuitry 18 and IC terminals 24, for example, an IC 10 that operates in a single chip mode having no external bus. In one embodiment of the present invention, debug port 20 is bi-directionally coupled to one or more IC terminals 22 which allow debug port 20 to communicate with devices (not shown) which are external to IC 10.

Figure 2:
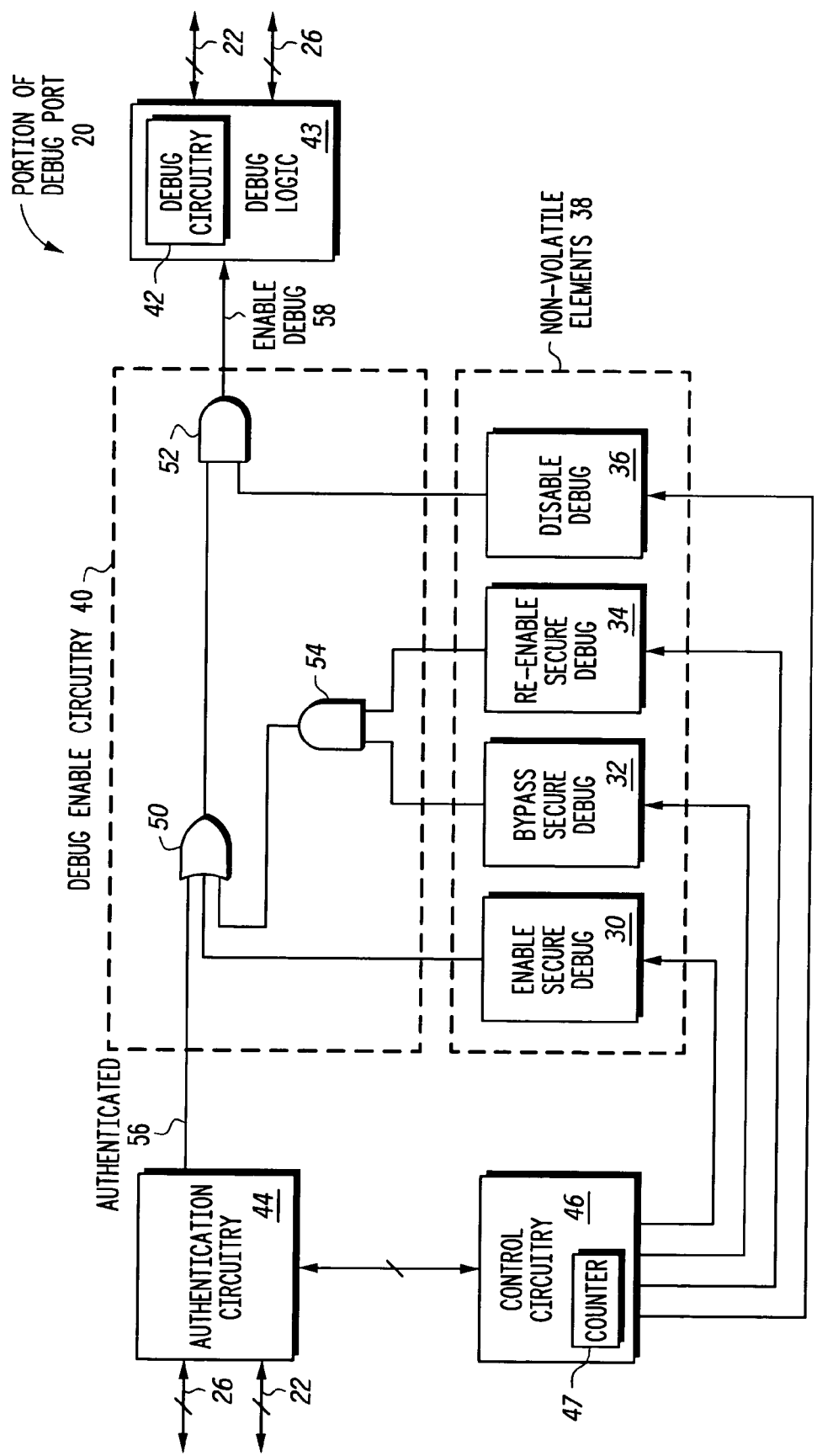
FIG. 2 illustrates, in partial block diagram form and partial schematic diagram form, a portion of debug port 20 of FIG. 1 in accordance with one embodiment of the present invention.

FIG. 2 illustrates, in block diagram form, a portion of debug port 20 of FIG. 1 in accordance with one embodiment of the present invention. In one embodiment, debug port 20 includes control circuitry 46 which is coupled to non-volatile elements 38 to provide control and/or programming for non-volatile elements 38. In one embodiment of the present invention, one or more of non-volatile elements 38 may be formed using one-time programmable circuitry, such as one time programmable memory. In alternate embodiments of the present invention, one or more of non-volatile elements 38 may be formed using any type of fuse. Note that non-volatile elements 38 may be formed using only one type of non-volatile element, or alternately may be formed using a plurality of different types of non-volatile elements. In the embodiment illustrated in FIG. 2, non-volatile elements 38 include enable secure debug element 30, bypass secure debug element 32, re-enable secure debug element 34, and disable debug element 36. Alternate embodiments of the present invention may use any number of non-volatile elements 38. Control circuitry 46 is used to change the logic state of non-volatile elements 38. In one embodiment of the present invention control circuitry 46 includes counter 47 which may be used to provide a predetermined amount of time.

Debug enable circuitry 40 receives signals from non-volatile elements 38 and authentication circuitry 44, and based upon those received signals, debug enable circuitry 40 selectively asserts an enable debug signal 58. The enable debug signal 58 is provided from debug enable circuitry 40 to debug logic 43. Debug logic 43 includes debug circuitry 42 which is affected by the enable debug signal 58. In alternate embodiments of the present invention, debug circuitry 42 may include all or only a portion of debug logic 43. In some embodiments, debug logic 43 may include other circuitry used for debug purposes which is not enabled or disabled by enable debug signal 58. The enable debug signal 58 is used by the debug circuitry 42 to enable one or more debug functions performed by debug circuitry 42. Debug circuitry 42 may be used to debug one or more portions of the protected functional circuitry 12 on IC 10 (see FIG. 1).

Note that authentication circuitry 44 may perform any type of authentication using any combination of hardware and software. In addition, some embodiments of the present invention may not even use authentication circuitry 44 at all. For one example of authentication which may be used with the present invention, see "INTEGRATED CIRCUIT SECURITY AND METHOD THEREFOR", U.S. patent Ser. No. 10/100,462, filed Mar. 18, 2002, assigned to the assignee hereof, and which is hereby incorporated by reference.

In the illustrated embodiment, debug enable circuitry 40 is implemented using OR gate 50, AND gate 52, and AND gate 54. Alternate embodiments of the present invention may implement debug enable circuitry 40 using any desired circuitry. The specific gates illustrated in FIG. 2 are just one possible embodiment for debug enable circuitry 40. In the embodiment of debug enable circuitry illustrated in FIG. 2, AND gate 54 receives a first input from bypass secure debug element 32 and receives a second input from re-enable secure debug element 34. OR gate 50 receives a first input from authentication circuitry 44, receives a second input from enable secure debug element 30, and receives a third input from the output of AND gate 54. AND gate 52 receives a first input from the output of OR gate 50 and receives a second input from the disable debug element 36. For the specific embodiment of debug enable circuitry 40 which uses gates 50, 52, and 54, enable secure debug element 30 is initially a logic level one, bypass secure debug element 32 is initially a logic level zero, re-enable secure debug element 34 is initially a logic level one, and disable debug element 36 is initially a logic level one.

In embodiments of the present invention that utilize authentication circuitry 44, authentication circuitry 44 may be bi-directionally coupled to control circuitry 46. In some embodiments of the present invention, authentication circuitry 44 may be coupled to communication signals 26 and/or to IC terminals 22. In some embodiments of the present invention, debug logic 43 may be coupled to communication signals 26 and/or to IC terminals 22.

Figure 3:
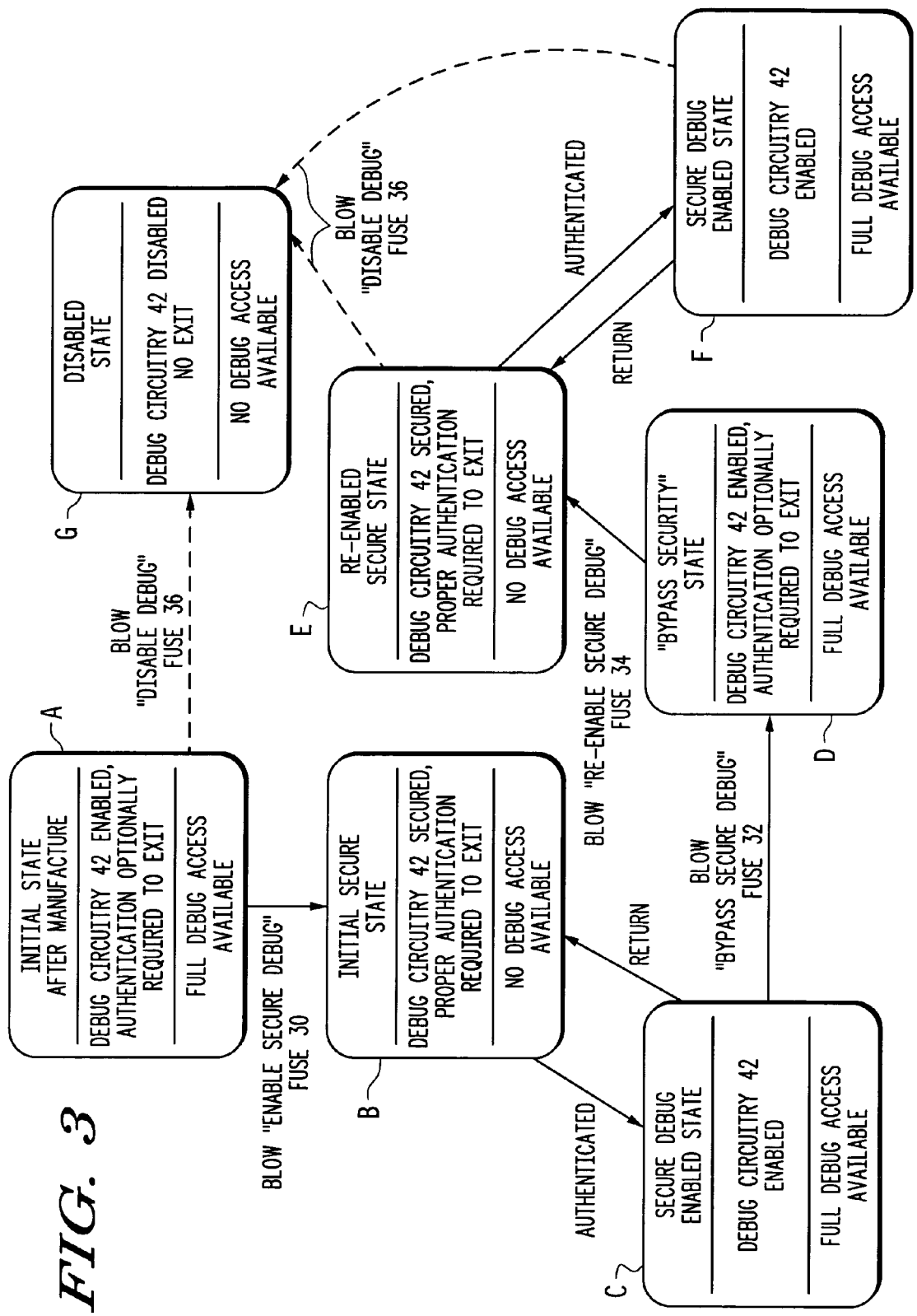
FIG. 3 illustrates, in state diagram form, a method for progressively enabling and disabling security to debug circuitry 42 of FIG. 2 in accordance with one embodiment of the present invention.

FIG. 3 illustrates, in state diagram form, a method for progressively enabling and disabling security to debug circuitry 42 of FIG. 2 in accordance with one embodiment of the present invention. For the purposes of this state diagram, it will be assumed that non-volatile elements 38 are implemented as fuses, although other embodiments of the present invention may use any desired circuitry to implement non-volatile elements 38. The state diagram illustrated in FIG. 3 starts at STATE A. In one embodiment of the present invention, STATE A is the initial state after the manufacture of IC 10. In the illustrated STATE A, debug circuitry 42 is enabled and full debug access to protected functional circuitry 12 (see FIG. 1) is available. In some embodiments, authentication may be required to exit STATE A, and in other embodiments no authentication may be required to exit STATE A. STATE B may be entered from STATE A by blowing the enable secure debug fuse 30 which permanently transitions from a logic level one to a logic level zero.

In the initial secure state, STATE B, debug circuitry 42 is secured and no debug access to protected functional circuitry 12 (see FIG. 1) is available. Authentication is then used to transition from STATE B to STATE C. Again, any type of authentication may be used. Note that the authentication used to transition from STATE B to STATE C may be the same as or different than the authentication optionally used to exit STATE A.

In one embodiment of the present invention, STATE C is a secure debug enabled state. In the illustrated STATE C, debug circuitry 42 is enabled and full debug access to protected functional circuitry 12 (see FIG. 1) is available. Note that in alternate embodiments of the present invention, the one or more portions of debug logic 43 that are enabled in STATE C may be the same as or different than the one or more portions of debug logic 43 that are enabled in STATE A.

A return from STATE C to STATE B is optional. If there is a return from STATE C to STATE B, the return may be caused by any desired mechanism, such as, for example, a hardware reset, a software reset, a debug instruction, or a time-out that automatically causes a state change. If a time-out is used to return to STATE B, then debug circuitry 42 is disabled a predetermined (fixed or user-programmable) amount of time after re-enabling the debug circuitry 42. Counter 47 (see FIG. 2) may be used to provide the predetermined amount of time to control circuitry 46. As one possible example, counter 47 may be loaded with a predetermined (fixed or user-programmable) value that is then counted down to zero to provide the predetermined amount of time. In alternate embodiments, any desired way may be used to provide a predetermined amount of time.

STATE D may be entered from STATE C by blowing the bypass secure debug fuse 32 which permanently transitions from a logic level zero to a logic level one, thus providing the proper inputs to the embodiment of debug enable circuitry 40 illustrated in FIG. 2. In one embodiment of the present invention, STATE D is the bypass security state. In the illustrated STATE D, debug circuitry 42 is enabled and full debug access to protected functional circuitry 12 (see FIG. 1) is available. Again, alternate embodiments of the present invention may use STATE D to enable one or more portions of debug logic 43, rather than all of debug logic 43. Debug circuitry 42 merely represents the one or more portions of debug logic 43 that can be disabled and/or re-enabled at a particular time. In some embodiments, authentication may be required to exit STATE D, and in other embodiments no authentication may be required to exit STATE D. Note that if authentication is used to exit STATE D, the authentication used to exit STATE D may be the same as or different than the authentication optionally used to exit STATE A and/or the authentication used to transition from STATE B to STATE C. Note that in alternate embodiments of the present invention, the one or more portions of debug logic 43 that are enabled in STATE D may be the same as or different than the one or more portions of debug logic 43 that are enabled in STATE A and/or in STATE C.

STATE E may be entered from STATE D by blowing the re-enable secure debug fuse 34 which permanently transitions from a logic level one to a logic level zero, thus providing the proper inputs to the embodiment of debug enable circuitry 40 illustrated in FIG. 2. In one embodiment of the present invention, STATE E is the re-enabled secure state. In the illustrated STATE E, debug circuitry 42 is secured and no debug access to protected functional circuitry 12 (see FIG. 1) is available. Authentication is then used to transition from STATE E to STATE F. Again, any type of authentication may be used. Note that the authentication used to transition from STATE E to STATE F may be the same as or different than the authentication optionally used to exit STATE A and/or the authentication used to transition from STATE B to STATE C.

In one embodiment of the present invention, STATE F is a secure debug enabled state. In the illustrated STATE F, debug circuitry 42 is enabled and full debug access to protected functional circuitry 12 (see FIG. 1) is available. Note that in alternate embodiments of the present invention, the one or more portions of debug logic 43 that are enabled in STATE F may be the same as or different than the one or more portions of debug logic 43 that are enabled in STATE A and/or in STATE C and/or in STATE D.

A return from STATE F to STATE E is optional. If there is a return from STATE F to STATE E, the return may be caused by any desired mechanism, such as, for example, a hardware reset, a software reset, a debug instruction, or a time-out that automatically causes a state change. If a time-out is used to return to STATE E, then debug circuitry 42 is disabled a predetermined (fixed or user-programmable) amount of time after re-enabling the debug circuitry 42. Counter 47 (see FIG. 2) may be used to provide the predetermined amount of time to control circuitry 46. As one possible example, counter 47 may be loaded with a predetermined (fixed or user-programmable) value that is then counted down to zero to provide the predetermined amount of time. In alternate embodiments, any desired way may be used to provide a predetermined amount of time.

In one embodiment of the present invention, STATE G is a disable state. STATE G may be entered from any one of STATE A, STATE E, or STATE F by blowing the disable debug fuse 36 which permanently transitions from a logic level one to a logic level zero, thus providing the proper inputs to the embodiment of debug enable circuitry 40 illustrated in FIG. 2. In the illustrated STATE G, debug circuitry 42 is disabled and no debug access to protected functional circuitry 12 (see FIG. 1) is available. In one embodiment of the present invention, STATE G is intended to be a final state that cannot be exited.

STATES E, F, and G described above are optional and one or more of them may be implemented in various embodiments of the present invention. Thus for some embodiments of the present invention, re-enable secure debug elements 34 and/or disable debug element 36 may not be implemented. Also, in an alternate embodiment of the present invention, bypass secure debug element 32 and re-enable secure debug element 34 may not be implemented; instead, disable debug element 36 may be used to directly transition from STATE C to STATE G.

The state diagram described in FIG. 3 may be implemented using any type of circuitry in control circuitry 46 and debug enable circuitry 40. Thus, although the functionality of FIG. 3 has been described in the form of a state diagram, the functionality of FIG. 3 may be implemented as a state machine using clocked logic, as combinational logic, or as any combination thereof. As stated before, non-volatile elements 38 may be implemented using any type of non-volatile circuitry: fuses are just one example.

One possible advantage, among others, to using the particular embodiment described in FIG. 3 is that non-volatile elements 38 may optionally be used in combination with any desired authentication approach. This allows an IC 10 to be manufactured in an initial state (STATE A) that allows full debug access during the product development phase of IC 10. Then before sale of IC 10 to an original equipment manufacturer (e.g. a manufacturer of cellular telephones, automobiles, etc.), the logic state of enable secure debug element 30 is changed so that all or a portion of debug access to circuitry 12 by way of debug circuitry 42 is disabled (STATE B). However, it is usually desirable to allow access to protected functional circuitry 12 by way of debug circuitry 42 to "the original equipment manufacturer (OEM) and/or the IC manufacturer" (herein collectively referred to as the manufacturer) so that the manufacturer can debug IC 10 or their product or system which uses IC 10 after a product using IC 10 has been sold. However, the manufacturer often wants an authentication procedure to be required (transition from STATE B to STATE C) so that only the manufacturer has access to the protected functional circuitry 12 by way of debug circuitry 42. The manufacturer is then free to perform debug operations in STATE C and/or STATE D.

One use for STATE C is to require authentication before STATE D can be entered. Another use of STATE C is to allow debugging and then a return to STATE B if the debug or other software tools being used can handle performing the required authentication process. If authentication is desired to be required, the system can be left in STATE B until a debug operation is to be performed. At that point authentication may be performed to transition to STATE C to perform debug functions. Conversely, the manufacturer may later decide that no authentication is desired to be required for performing debug operations, and thus may place the circuitry in STATE D, in which authentication is no longer required to perform a debug operation. One use for state D is to allow the manufacturer to use off-the-shelf debug and other software tools that do not have knowledge of the authentication process. From STATE C, the manufacturer can transition to STATE D where software tools having no knowledge of the authentication process can operate freely. In one embodiment of the present invention, the logic state of bypass secure debug element 32 is transitioned in order to go from STATE C to STATE D.

From STATE D, once the manufacturer has finished their product development and is ready to provide their products to customers, the manufacturer can then change the logic state of re-enable secure debug element 34 so that all debug access to circuitry 12 by way of debug circuitry 42 is disabled (STATE E). Note that for some embodiments of the present invention, the manufacturer may instead desire to transition from STATE C directly to a permanently disabled state (e.g. STATE G). One purpose for a permanently disabled state (STATE G) may be to prevent any further access to protected functional circuitry 12 by way of debug circuitry 42. However, in order to perform further service, repair, or failure analysis on the manufacturer's electronic device, a non-permanently disabled state (e.g. STATE E) may be required. If a non-permanently disabled state (STATE E) is used, then access to protected functional circuitry 12 by way of debug circuitry 42 may again be achieved by completing a predetermined authentication process (authentication provides state transition from STATE E to STATE F). Note that some debug and/or emulation software which may be utilized in STATES A, C, D, and F to actually debug or analyze IC 10 may not be required to have knowledge of the authentication process, including any passwords or keys. The authentication process may be separate from the debug and/or emulation software. The authentication process may include hardware and/or software, separate from debug circuitry 42, that is used to transition from a "no debug access available state" to a "debug access available" state (see FIG. 3, transitions from STATE B to STATE C and from STATE E to STATE F).

Note that in some embodiments, asserting a subsequent non-volatile element 38 may have the effect of overriding a previously asserted non-volatile element 38. For example, assertion of the bypass secure debug element 32 may have the effect of overriding the enable secure debug element 30. Similarly, assertion of the re-enable secure debug element 34 may have the effect of overriding the bypass secure debug element 32.

In the foregoing specification, the invention has been described with reference to specific embodiments. However, one of ordinary skill in the art appreciates that various modifications and changes can be made without departing from the scope of the present invention as set forth in the claims below. For example, debug circuitry 42 (see FIG. 2) may include circuitry which implements one or more standard debug, emulation, or test interfaces and protocols, such as, for example, a JTAG interface and protocol. In one embodiment, IC terminals 22 may include JTAG TDO (test data out) and TDI (test data in) signals.

Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method for providing security for debug circuitry, comprising:
   providing the debug circuitry, wherein the debug circuitry is enabled;
   programming a first nonvolatile element to disable the debug circuitry; and
   after programming the first nonvolatile element, programming a second nonvolatile element to perform one of re-enabling the debug circuitry and permanently disabling the debug circuitry.

2. The method of claim 1, wherein, after programming the first nonvolatile element and prior to programming the second nonvolatile element, the debug circuitry is capable of being selectively enabled in response to authentication.

3. The method of claim 1, wherein the second nonvolatile element is programmed to re-enable the debug circuitry.

4. The method of claim 3, further comprising:
   after programming the second nonvolatile element, programming a third nonvolatile element to disable debug, wherein after programming the third nonvolatile element, the debug circuitry is capable of being selectively enabled in response to authentication.

5. The method of claim 4, wherein the first nonvolatile element comprises a first fuse, the second nonvolatile element comprises a second fuse, and the third nonvolatile element comprises a third fuse, and wherein:
   programming the first nonvolatile element comprises blowing the first fuse;
   programming the second nonvolatile element comprises blowing the second fuse; and
   programming the third nonvolatile element comprises blowing the third fuse.

6. The method of claim 4, further comprising:
   after programming the third nonvolatile element, programming a fourth nonvolatile element to permanently disable the debug circuitry.

7. The method of claim 1, wherein the second nonvolatile element is programmed to permanently disable the debug circuitry.

8. The method of claim 1, wherein the first nonvolatile element comprises a first fuse and the second nonvolatile element comprises a second fuse, and wherein programming the first nonvolatile element comprises blowing the first fuse and wherein programming the second nonvolatile element comprises blowing the second fuse.

9. A method for providing security for debug circuitry, comprising:
   providing the debug circuitry in a secure debug state in which the debug circuitry is capable of being selectively enabled in response to authentication;
   enabling the debug circuitry in response to authentication; and
   after enabling the debug circuitry in response to authentication, programming a first nonvolatile element
   after programming the first nonvolatile element, programming a second nonvolatile element, wherein, after programming the second nonvolatile element, the debug circuitry is in a re-enabled secure debug state in which the debug circuitry is capable of being selectively enabled in response to authentication.

10. The method of claim 9, wherein, after programming the first nonvolatile element, the debug circuitry is in a bypass security state in which the debug circuitry is enabled.

11. The method of claim 9, wherein the first nonvolatile element comprises a first fuse and the second nonvolatile element comprises a second fuse, and wherein programming the first nonvolatile element comprises blowing the first fuse and wherein programming the second nonvolatile element comprises blowing the second fuse.

12. The method of claim 9, further comprising:
   after programming the second nonvolatile element, programming a third nonvolatile element to permanently disable the debug circuitry.

13. An integrated circuit, comprising:
   debug circuitry;
   a first nonvolatile element;
   a second nonvolatile element; and
   debug enable circuitry which provides a debug enable indicator to the debug circuitry based on the first and second nonvolatile elements, wherein:
      the first nonvolatile element indicates whether or not the debug circuitry is in a secure debug state in which the debug circuitry can be selectively enabled in response to authentication; and
      the second nonvolatile element indicates whether or not to override the first nonvolatile element.

14. The integrated circuit of claim 13, wherein the second nonvolatile element indicates whether or not to override the first nonvolatile element by indicating whether or not the debug circuitry is in a bypass security state in which the debug circuitry is re-enabled.

15. The integrated circuit of claim 14, further comprising a third nonvolatile element that indicates whether or not to override the second nonvolatile element.

16. The integrated circuit of claim 15, wherein the third nonvolatile element indicates whether or not to override the second nonvolatile element by indicating whether or not the debug circuitry is in a re-enabled secure debug state in which the debug circuitry can be selectively enabled in response to authentication.

17. The integrated circuit of claim 16, further comprising a fourth nonvolatile element that indicates whether or not the debug circuitry is permanently disabled.

18. The integrated circuit of claim 15, wherein the third nonvolatile element indicates whether or not to override the second nonvolatile element by indicating whether or not the debug circuitry is permanently disabled.

19. The integrated circuit of claim 13, wherein the second nonvolatile element indicates whether or not to override the first nonvolatile element by indicating whether or not the debug circuitry is permanently disabled.

20. The integrated circuit of claim 13, wherein the first nonvolatile element comprises a first fuse and the second nonvolatile element comprises a second fuse.

* * * * *